(12) United States Patent
Kordahi

(10) Patent No.: US 9,658,417 B2
(45) Date of Patent: May 23, 2017

(54) CONDUCTIVE WATER BLOCKING MATERIAL INCLUDING METALLIC PARTICLES AND AN OPTICAL CABLE AND METHOD OF CONSTRUCTING AN OPTICAL CABLE INCLUDING THE SAME

(71) Applicant: Tyco Electronics Subsea Communications LLC, Eatontown, NJ (US)

(72) Inventor: Maurice E. Kordahi, Atlantic Highlands, NJ (US)

(73) Assignee: TYCO ELECTRONICS SUBSEA COMMUNICATIONS LLC, Eatontown, NJ (US)

( * ) Notice: Subject to any disclaimer, the term of this patent is extended or adjusted under 35 U.S.C. 154(b) by 21 days.

(21) Appl. No.: 14/094,751

(22) Filed: Dec. 2, 2013

(65) Prior Publication Data

US 2015/0153530 A1   Jun. 4, 2015

(51) Int. Cl.
| | | |
|---|---|---|
| G02B 6/44 | (2006.01) | |
| B29D 11/00 | (2006.01) | |
| B29K 105/00 | (2006.01) | |
| B29K 105/16 | (2006.01) | |
| B29K 505/10 | (2006.01) | |

(52) U.S. Cl.
CPC ...... G02B 6/4416 (2013.01); B29D 11/00875 (2013.01); G02B 6/4415 (2013.01); G02B 6/4427 (2013.01); G02B 6/4494 (2013.01); B29K 2105/0061 (2013.01); B29K 2105/16 (2013.01); B29K 2505/10 (2013.01); B29K 2995/0005 (2013.01)

(58) Field of Classification Search
None
See application file for complete search history.

(56) References Cited

U.S. PATENT DOCUMENTS

| | | | |
|---|---|---|---|
| 3,607,487 A | 9/1971 | Biskeborn et al. | |
| 3,885,380 A | 5/1975 | Hacker | |
| 3,944,717 A | 3/1976 | Hacker et al. | |
| 4,718,747 A * | 1/1988 | Bianchi | G02B 6/4401 385/103 |
| 4,765,711 A * | 8/1988 | Obst | G02B 6/443 174/70 R |

(Continued)

FOREIGN PATENT DOCUMENTS

| | | |
|---|---|---|
| CA | 2298915 A1 | 8/2000 |
| CN | 202487277 | 10/2012 |

(Continued)

OTHER PUBLICATIONS

International Search Report, International Application No. PCT/US2014/066798, International Filing Date Nov. 21, 2014.

*Primary Examiner* — Hemang Sanghavi

(57) ABSTRACT

A conductive water blocking material and an optical fiber cable and method of constructing an optical fiber cable including the same. The cable includes at least one optical fiber and strength members disposed around the fiber. A conductor is disposed around the strength members. The conductive water blocking material includes a carrier material and conductive metallic particles and is provided in strength member interstices defined by the strength members.

20 Claims, 4 Drawing Sheets

(56) References Cited

U.S. PATENT DOCUMENTS

| | | | |
|---|---|---|---|
| 4,904,047 A * | 2/1990 | Powell | G02B 6/4492 385/100 |
| 5,125,061 A * | 6/1992 | Marlier et al. | 385/101 |
| 5,125,062 A * | 6/1992 | Marlier et al. | 385/101 |
| 5,426,716 A | 6/1995 | Arroyo et al. | |
| 6,195,486 B1 | 2/2001 | Field et al. | |
| 6,301,413 B1 | 10/2001 | Bringuier | |
| 6,469,251 B1 | 10/2002 | Dupuis | |
| 6,496,629 B2 | 12/2002 | Ma et al. | |
| 6,501,887 B1 | 12/2002 | Bringuier et al. | |
| 8,440,909 B2 | 5/2013 | Van Der Meer | |
| 2010/0215327 A1 | 8/2010 | Braden et al. | |
| 2011/0075979 A1* | 3/2011 | Ma et al. | 385/107 |

FOREIGN PATENT DOCUMENTS

| | | |
|---|---|---|
| CN | 102779577 | 11/2012 |
| CN | 102867593 | 1/2013 |
| CN | 202855422 | 4/2013 |
| CN | 202871386 | 4/2013 |
| CN | 202887841 | 4/2013 |
| EP | 1238301 A2 | 9/2002 |
| EP | 2648192 | 9/2013 |
| WO | 99/26095 | 5/1999 |
| WO | 0157574 A1 | 8/2001 |
| WO | 0195004 A2 | 12/2001 |

\* cited by examiner

CONDUCTIVE WATER BLOCKING MATERIAL INCLUDING METALLIC PARTICLES AND AN OPTICAL CABLE AND METHOD OF CONSTRUCTING AN OPTICAL CABLE INCLUDING THE SAME

TECHNICAL FIELD

The present invention relates to undersea optical cables and, more particularly, to conductive water blocking material including metallic particles and an optical cable and method of constructing an optical cable including the same.

BACKGROUND

Optical fibers may be used as transmission paths for optical signals in communication networks. Such optical fibers often must extend across many miles in an undersea or submarine environment. To protect the optical fibers and to provide a conductive path for providing electrical power to devices such as amplifiers, branching units, etc., the optical fibers may be included in an optical cable. An undersea or submarine optical cable may include, for example, layers of strength members, tubing, one or more electrical conductors, insulation, shielding, and sheaths depending upon the system environmental conditions.

One risk associated with providing optical cables in an undersea environment is that the cable will be inadvertently cut or severed. When an optical cable is cut, water may be forced into the cable, e.g. between the optical fibers or the strength members, thereby damaging the cable and devices coupled thereto. To provide a barrier to ingress of water into the cable, various water blocking materials have been used. Known water blocking materials include layers of material design to swell in the presence of water and water blocking gels or liquids that may be provided between optical fibers or strength members.

BRIEF DESCRIPTION OF THE DRAWINGS

Reference should be made to the following detailed description which should be read in conjunction with the following figures, wherein like numerals represent like parts.

DETAILED DESCRIPTION

Consistent with the present disclosure, an optical cable configuration may be provided with a conductive water blocking material including metallic particles. The conductive water blocking material may be provided in strength member interstices defined by strength members disposed around optical fibers. A tubular conductor is disposed over and in electrical contact with the strength members. The conductor establishes a conductive path to which elements such as optical amplifiers, repeaters, branching units, etc. may be coupled for receiving electrical power. The metallic particles in the conductive water blocking material reduce the direct current (DC) resistance of the conductive path formed by the conductor.

The metallic particles also provide water blocking. When a carrier material in which the metallic particles are mixed dissolves or otherwise deteriorates in the presence of water, the metallic particles are forced by water pressure to travel into the cable along the length thereof. The water pressure thus compacts the metallic particles in the cable, ultimately establishing a metallic plug in the cable by filling strength member interstices with the metallic particles along a length sufficient to prevent further intrusion of water into the cable. Advantageously, therefore, conductive water blocking material including metallic particles consistent with the present disclosure provides secure water blocking while also reducing the resistance of the conductive path in the cable to allow efficient delivery of electrical power to undersea devices.

As used herein, the terms "couple" or "connect" and variations thereof refer generally to any type of electrical and/or mechanical connection and do not necessarily require a direct physical connection. Also, one element may be described herein as being "disposed around" another element. It is to be understood that an element may be disposed around an element but not necessarily in direct contact therewith and there may be intervening elements therebetween.

Figure 1:
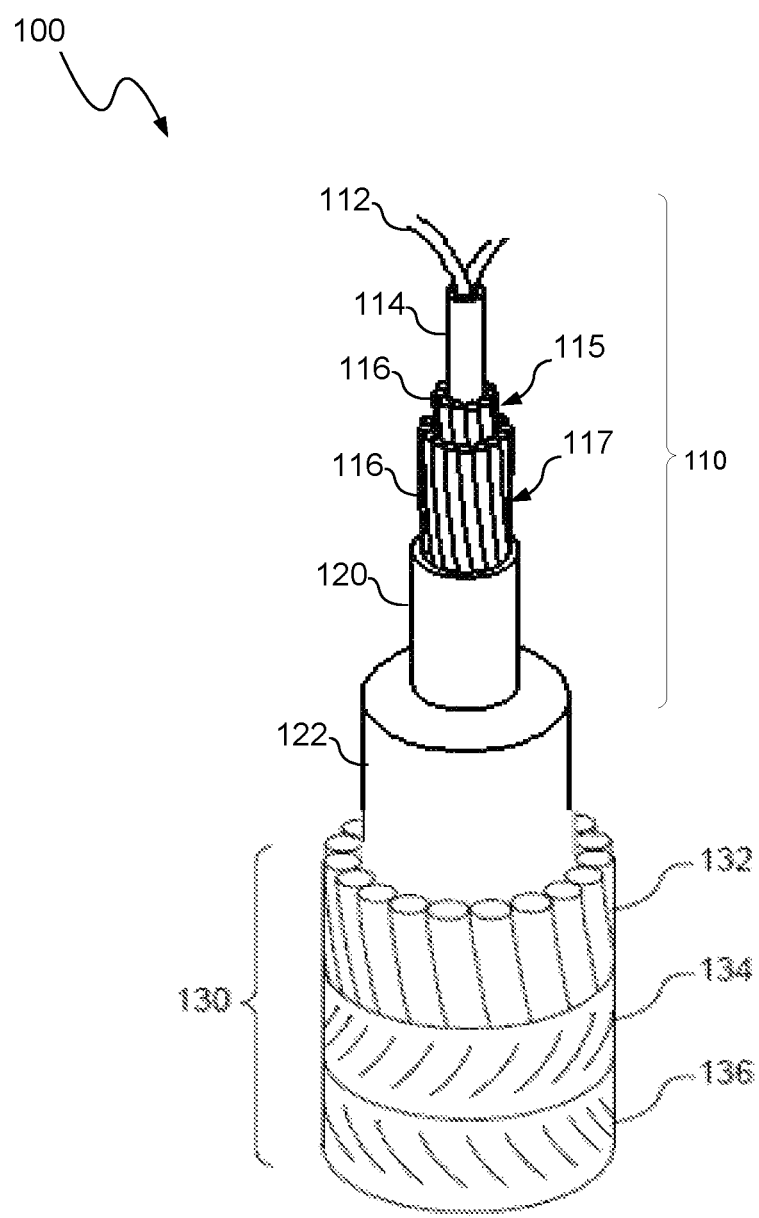
FIG. 1 is a cut-away perspective view of an undersea optical cable consistent with the present disclosure.

FIG. 1 is a perspective cut-away view of one embodiment of an optical cable 100 with conductive water blocking material consistent with the present disclosure. In general, the optical cable 100 includes a core cable portion 110 and an armored portion 130. The specific cable structure illustrated in FIG. 1 is provided for ease of illustration and explanation. It is to be understood that conductive water blocking material consistent with the present disclosure may be provided in any or all of the strength member interstices of an optical cable structure including one or more strength member and conductor sets. For example, conductive water blocking material consistent with the present disclosure may be provided in known optical cable configurations including known single core cable configurations or known multi-core cable configurations for providing water blocking and reducing the resistance of a conductive path in the cable.

In the illustrated exemplary embodiment the core cable portion of the optical cable 100 includes: one or more optical fibers 112, a buffer tube 114 disposed around the optical fibers 112, one or more layers 115, 117 of strength members 116 disposed around the buffer tube 114, a conductor 120 disposed around the strength members 116 and in physical and electrical contact with the strength members 116, and an electrical insulator 122 is disposed over the conductor 120. The armored portion 130 of the cable 100 may include one or more layers of armor wire strength members 132 disposed around the insulation layer 122 and one or more binder layers 134, 136 disposed around the strength members 132.

In general, the optical fibers 112 may include any type of optical fibers capable of carrying optical signals, as is known to those skilled in the art. The buffer tube 114 is dimensioned and arranged to protect the optical fibers 114 from external forces. The buffer tube 114 may be made of a polymer such as polycarbonate or polyamide, or a metal such as stainless steel, copper, or aluminum. A known water blocking material, such as a, such as a thixotropic, water-blockable gel, may be disposed in the buffer tube 114 surrounding the optical fibers 112.

The strength members 116 may be high strength metal wires, e.g. high strength steel wires and may be helically disposed around the buffer tube 114 in one or more layers. In the illustrated embodiment, for example, a first layer 115 of strength members 116 is disposed around the buffer tube 114 and in contact with the buffer tube 114 and a second layer 117 of strength members 116 is disposed concentrically around the first layer 115 of strength members 116. One or more of the layers 115, 117 may include strength members 116 of different diameters. As will be described in greater detail, a conductive water blocking material consistent with the present disclosure is disposed on and between the strength members 116.

The conductor 120 may be a conductive sheath or tube made of a conductive material such as copper. The conductor 120 is disposed around the strength members 116 and in electrical contact therewith. For example, the conductor 120 may be formed from an elongated copper strip which is welded longitudinally to constitute a tube and swaged onto the strength members 116. The conductor 120 establishes a conductive path that may be coupled to undersea devices such as optical amplifiers, repeaters, branching units, etc. for providing electrical power to the devices. The electrical insulator 122 may be a polymer sheath or tube that encapsulates and electrically insulates the conductor 120 from the armored portion 130. The armor wire strength members 132 and binder layers 134, 136 of the armored portion 130 may be disposed around the electrical insulator 122 to protect the cable 100 from damage.

Figure 2:
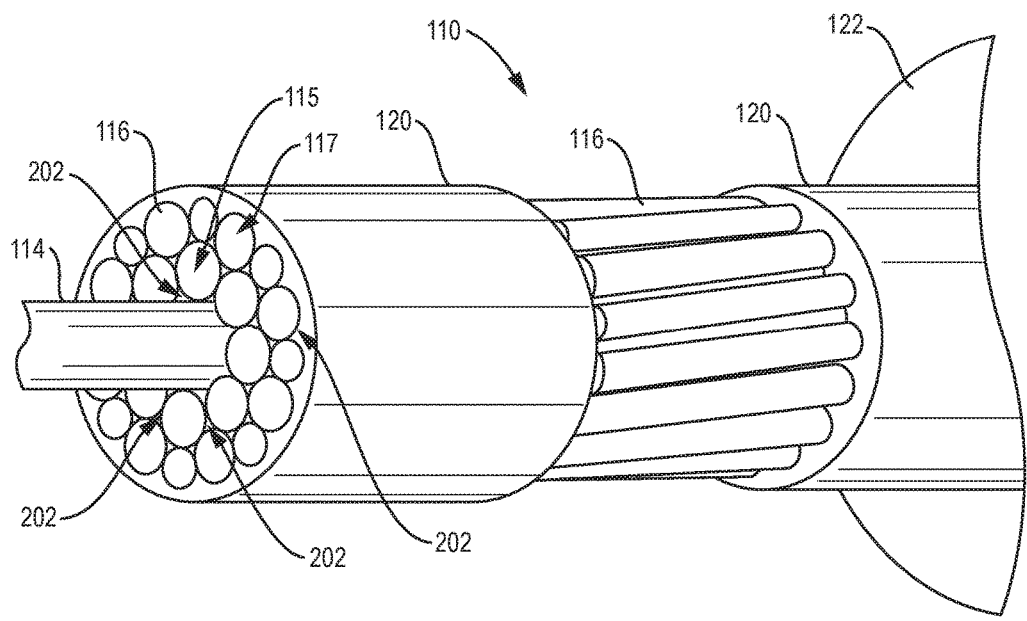
FIG. 2 is a cut-away perspective view of the core cable portion of the undersea optical cable shown in FIG. 1 without water blocking material consistent with the present disclosure.

FIG. 2 is a cut-away perspective view of the core cable portion 110 of the cable 100 shown in FIG. 1, but with the conductive water blocking omitted and a portion of the conductor 120 cut away along the length thereof. As shown, when the strength members 116 are disposed around the buffer tube 114, the shape and orientation of the strength members 116 define strength member interstices 202. In the illustrated embodiment, strength member interstices 202 are formed between strength members 116 of the first layer 115 and the buffer tube 114, between strength members 116 of the first layer 115 and strength members 116 of the second layer 117, and between strength members 116 of the second layer 117 and the conductor 120.

Figure 3:
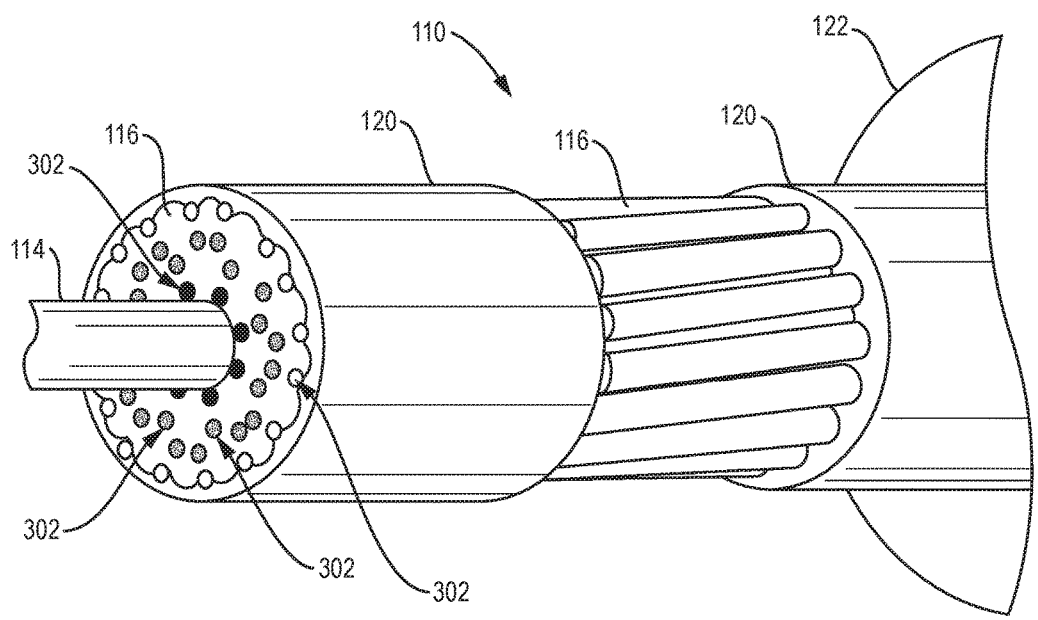
FIG. 3 a cut-away perspective view of the core cable portion of the undersea optical cable shown in FIG. 1.

FIG. 3 is a cut-way perspective view of the core cable portion 110 shown in FIG. 2 with conductive water blocking material 302 consistent with the present disclosure. As shown, the conductive water blocking material 302 is provided in the strength member interstices 202 (FIG. 2). Advantageously, the conductive water blocking material 302 includes metallic particles that reduce the resistance of the conductive path established by the conductor 120. In the illustrated embodiment, the conductive water blocking material 302 is provided in all of the strength member interstices 202 (FIG. 2) and along the entire length of the cable 100 (FIG. 1). It is to be understood, however, that advantages associated with use of conductive water blocking material 302 consistent with the present disclosure, may be achieved by providing the conductive water blocking material 302 in only a portion of the interstices 202 or along only a portion length of the cable 100.

In general, conductive water blocking material 302 consistent with the present disclosure includes conductive metallic particles mixed and a carrier material. To achieve effective reduction of the DC resistance of the conductive path in an optical cable, the conductive metallic particles should include highly conductive metallic particles. As used herein, the term "highly conductive" refers to a metal having a relative electrical conductivity of greater than 60, using copper as a base reference (conductivity of 100). Copper may be a preferred material for the conductive metallic particles since it is currently the most economical highly conductive metal. The conductive metallic particles may be particles of a single metal or a blend of particles of different metals; however, at least a portion of the constituent particles of the conductive metallic particles should be highly conductive. Table 1 below illustrates the relative conductivity of some examples of highly conductive metals useful in a conductive water blocking material 302 consistent with the present disclosure:

TABLE 1

| Metal | Relative Electrical Conductivity (%) |
|---|---|
| Silver | 105 |
| Copper | 100 |
| Gold | 70 |
| Aluminum | 61 |

The conductive metallic particles may be provided in the form of a metallic powder having a grain size depending upon the size and configuration of the cable and/or the strength member interstices 202. At least a portion of the metallic particles should fit within the strength member interstices 202, and the metallic particles may be provided in single grain size or a blend of grain sizes so that smaller particles fit within interstices between larger particles. In one embodiment, for example, the conductive metallic particles may be provided in the form of a copper powder of +100 mesh, +200 mesh and/or +325 mesh grains of irregular and/or spherical shape.

The carrier material in which the metallic particles are dispersed to form conductive water blocking material 302 consistent with the present disclosure may be a liquid or gel. The carrier material may, for example, be a known thixotropic, water-blockable gel, or a urethane material that is applied as a liquid and cures to a solid or semi-solid state. Thixotropic water blocking gel materials are described, for example, in U.S. Pat. No. 6,496,629, the teachings of which are hereby incorporated herein by reference.

In some embodiments, the conductive water blocking material 302 may be prepared by pre-mixing the conductive metal particles with the carrier material, and the conductive water blocking material 302 may be applied to or around the strength members 116 so that it flows into the strength member interstices 202. For example, as the cable 100 is assembled the strength members 116 may be passed through a bath of the conductive water blocking material 302 whereby the carrier material carries the metallic particles into the strength member interstices 202. Alternatively, the conductive water blocking material 302 may applied on the top or bottom of one or more of the layers 115, 117 of strength members 116 so that it flows into the strength member interstices 202. The combination of the carrier material and the size and amount of the metallic particles should thus be chosen so that the conductive water blocking material 302 has sufficient viscosity to flow into the strength member interstices 202 during assembly. The particular combination of carrier material and the size and amount of the metallic particles used for a particular cable will vary depending on, for example, the size and configuration of the cable, the ambient temperature during application, and the application process.

In other embodiments, or the carrier material may be applied to or around the strength members 116 and the conductive metallic particles may be applied to the top of the carrier material in powder form. For example, the strength members 116 may be passed through a bath of the carrier material, or the carrier may be applied to the top or bottom of one or more of the layers 115, 117 of the strength members 116. The conductive metallic particles may then be applied on top of the carrier material. The conductive metallic particles may then mix with the carrier material and be carried into the strength member interstices 202 by the carrier material.

Figure 4A:
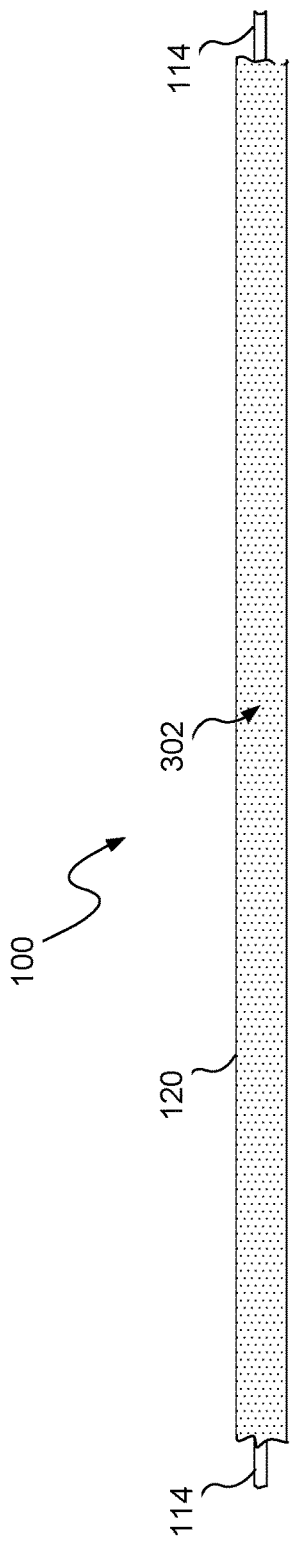
FIG. 4A diagrammatically illustrates a portion of an undersea optical cable including water blocking material consistent with the present disclosure.
Figure 4B:
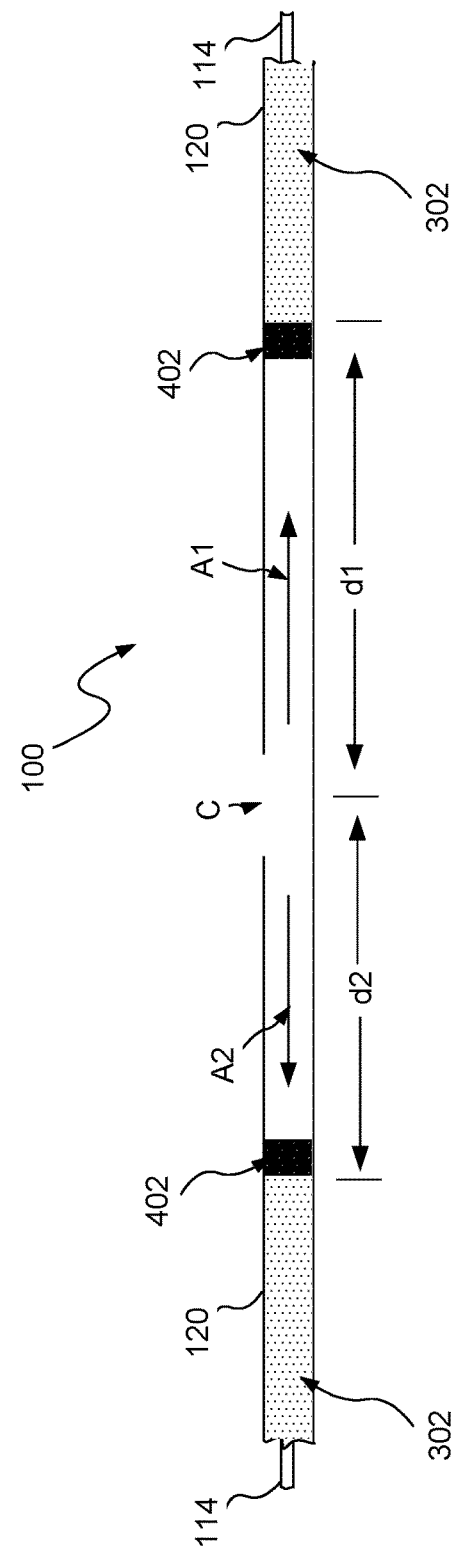
FIG. 4B illustrates the portion of the undersea cable shown in FIG. 4A with a cable cut.

In addition to reducing the DC resistance of the conductive path provided by the conductor 120, conductive water blocking material 302 consistent with the present disclosure provides effective water-blocking in the event the cable 100 is cut or severed. FIGS. 4A and 4B, for example, diagrammatically illustrate a portion of the optical fiber cable 100 including conductive water blocking material 302 consistent with the present disclosure. In FIG. 4A the cable 100 is unbroken and the conductive water blocking material 302 is provided along the length of the illustrated portion of the cable 100. As shown in FIG. 4B, when the conductor 120 of the cable is cut or severed, e.g. at location C, water pressure in the undersea environment forces water into the strength member interstices 202 (FIG. 2), which forces the conductive water blocking material 302 in a direction along the length of the cable 100 as illustrated by arrows A1 and A2. In addition, the water may cause the carrier material of the conductive water blocking material 302 to dissolve and/or be forced out of the cable.

Advantageously, however, as the metallic particles of the conductive water blocking material 302 is forced along the length of the cable 100 by the water, the density of the metallic particles within the strength member interstices 202 increases until all the strength member interstices 202 are filled to an amount sufficient to prevent further intrusion of water into the cable 100. The metallic particles thus form metallic plugs 402 in the cable 100 at associated distances d1, d2 from the cable break at location C. The metallic plugs 402 ensure that the cable 100 is not damaged by water intrusion past the location of the plugs 402. The cable 100 may then repaired by cutting the cable 100 at a locations beyond the plugs 402 and splicing a new cable section therebetween.

Figure 5:
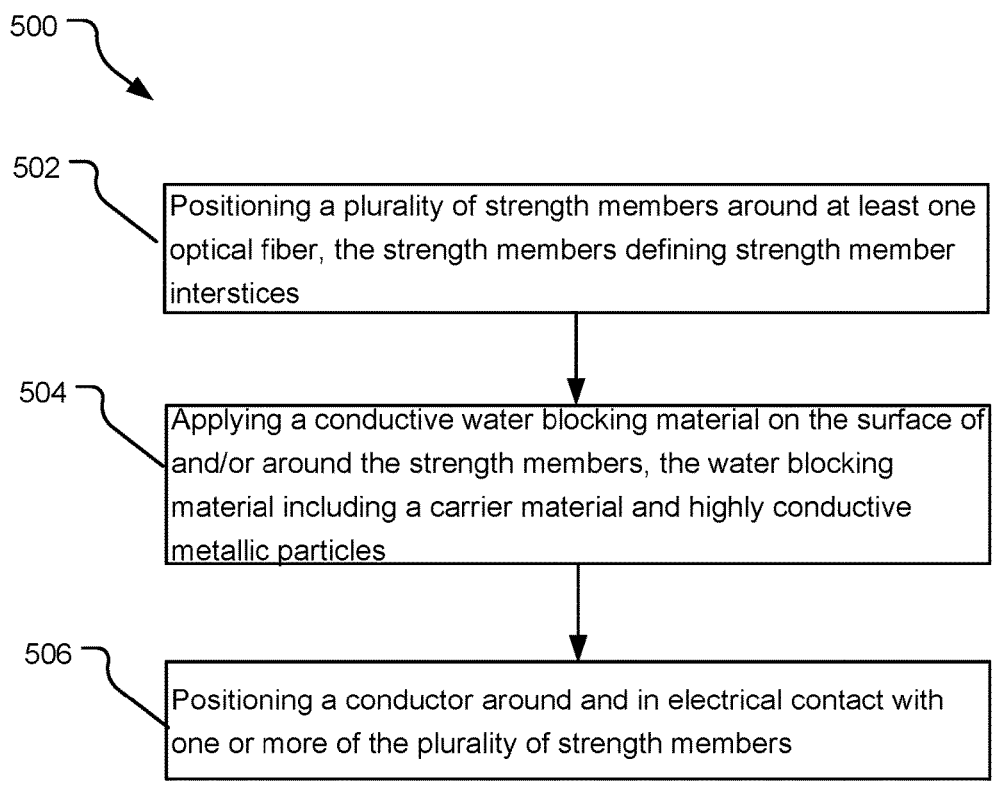
FIG. 5 is flow chart illustrating one example of a method consistent with the present disclosure.

FIG. 5 is a flow chart illustrating a method 500 consistent with the present disclosure. Operation 502 includes positioning a plurality of strength members around at least one optical fiber. The strength members define strength member interstices. A conductive water blocking material including a carrier material and highly conductive metallic particles is applied 504 to (i.e. on the surface of and/or or around) the strength members. A conductor is positioned 506 around and in electrical contact with one or more of the plurality of strength members.

While FIG. 5 illustrates various operations according to an embodiment, it is to be understood that not all of the operations depicted in FIG. 5 are necessary for other embodiments. Indeed, it is fully contemplated herein that in other embodiments of the present disclosure, the operations depicted in FIG. 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

According to one aspect of the present disclosure, there is thus provided an optical fiber cable including: at least one optical fiber; a plurality of strength members disposed around the at least one optical fiber and defining strength member interstices; a conductor disposed around and in electrical contact with one or more of the plurality of strength members; and a conductive water blocking material disposed in the strength member interstices. The conductive water blocking material includes a carrier material and highly conductive metallic particles.

According to another aspect of the present disclosure, there is provided a method of constructing an undersea optical cable including a conductive path and water blocking capability, the method including: positioning a plurality of strength members around at least one optical fiber, the strength members defining strength member interstices; applying a conductive water blocking material to the strength members, the water blocking material including a carrier material and highly conductive metallic particles; and positioning a conductor around and in electrical contact with one or more of the plurality of strength members.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An optical fiber cable comprising:
   at least one optical fiber;
   a plurality of strength members disposed around said at least one optical fiber and defining strength member interstices;
   a conductor disposed around and in electrical contact with one or more of said plurality of strength members; and
   a conductive water blocking material disposed in said strength member interstices, said conductive water blocking material comprising a carrier material and highly conductive metal particles having a predetermined size and a relative electrical conductivity greater than 60, using copper as a base reference with a relative electrical conductivity of 100.

2. An optical fiber cable according to claim 1, wherein said at least one optical fiber is disposed within a buffer tube, and wherein said plurality of strength members are disposed around and in contact with said buffer tube.

3. An optical fiber cable according to claim 1, wherein said strength members are wires provided in first and second layers, said second layer being disposed around said first layer and being in electrical contact with said conductor.

4. An optical fiber cable according to claim 1, wherein said highly conductive metal particles are copper particles.

5. An optical fiber cable according to claim 1, wherein said carrier material comprises a thixotropic gel.

6. An optical fiber cable according to claim 1, wherein said highly conductive solid metal particles comprise a blend of two or more different metals.

7. An optical fiber cable according to claim 1, wherein said highly conductive metal particles comprise a metal having a relative electrical conductivity of at least 100.

8. An optical fiber cable according to claim 1, wherein the predetermined size is +325 mesh.

9. A method of constructing an undersea optical cable comprising a conductive path and water blocking capability, said method comprising:

positioning a plurality of strength members around at least one optical fiber, said strength members defining strength member interstices;

selecting grains of highly conductive metal having a predetermined size and a relative electrical conductivity greater than 60, using copper as a base reference with a relative electrical conductivity of 100;

applying a conductive water blocking material to said strength members to cause the conductive water blocking material to be disposed in the strength member interstices, said conductive water blocking material comprising a carrier material and the selected grains of highly conductive metal; and positioning a conductor around and in electrical contact with one or more of said plurality of strength members.

10. A method according to claim 9, said method further comprising mixing said carrier material with said grains of highly conductive metal before said applying said conductive water blocking material to said strength members.

11. A method according to claim 9, wherein said applying said conductive water blocking material to said strength members comprises applying said carrier material to said strength member and then depositing said grains of highly conductive metal on said carrier material.

12. A method according to claim 9, wherein said at least one optical fiber is disposed within a buffer tube, and wherein positioning said plurality of strength members around said at least one optical fiber comprises positioning said plurality of strength members around and in contact with said buffer tube.

13. A method according to claim 9, wherein positioning said plurality of strength members around said at least one optical fiber comprises providing said strength members in first and second layers, said second layer being disposed around said first layer and being in electrical contact with said conductor.

14. A method according to claim 9, wherein said grains of highly conductive particles are copper particles.

15. A method according to claim 9, wherein said carrier material comprises a thixotropic gel.

16. A method according to claim 9, wherein said grains of highly conductive metal particles comprise a blend of two or more different metals.

17. A method according to claim 9, wherein said grains of highly conductive metal particles comprise a metal having a relative electrical conductivity of at least 100.

18. A method according to claim 9, wherein the selected grains of highly conductive metal have a grain size of +325 mesh.

19. An optical fiber cable comprising:

at least one optical fiber;

a plurality of strength members disposed around said at least one optical fiber and defining strength member interstices;

a conductor disposed around and in electrical contact with one or more of said plurality of strength members; and a conductive water blocking material disposed in said strength member interstices, said conductive water blocking material comprising a carrier material and grains of highly conductive metal having a predetermined grain size of +325 mesh and a relative electrical conductivity greater than 60, using copper as a base reference with a relative electrical conductivity of 100, wherein said grains of highly conductive metal comprise at least one metal with a conductivity at least that of copper.

20. An optical fiber cable according to claim 19, wherein said grains of highly conductive metal comprise a blend of at least two different metals.

* * * * *